UNITED STATES PATENT OFFICE.

JOSEPH C. HYATT, OF NEW YORK, N. Y.

IMPROVEMENT IN COMPOSITIONS FOR ROOFS.

Specification forming part of Letters Patent No. 152,997, dated July 14, 1874; application filed December 12, 1873.

*To all whom it may concern:*

Be it known that I, JOSEPH C. HYATT, of the city of New York, in the county and State of New York, have invented a new and Improved Composition or Cement for Coating Roofs, the Outsides of Buildings, Floors, &c.; and I do hereby declare that the following is a full, clear, and exact description of the same.

My invention relates to an improved cement or coating to be applied with a brush, trowel, or any other suitable instrument, to roofs, floors, the outsides of buildings, sidewalks, &c., whereby I produce an impervious durable surface, equaling stone in hardness, and which surface may be blocked off into squares, diamonds, &c., and present the appearance and effect of natural stone.

The principal ingredients in my composition are boiled fish-oil, ground or pulverized sesquioxide of iron, potash, gum-shellac, and pulverized calcined plaster-of-paris; and I find it desirable in many cases to use in conjunction with the above ingredients some suitable liquid drier, and sometimes soap-stone, and sometimes Portland or other hydraulic cement, and sometimes a pigment or paint as a coloring-matter.

To produce the cement or coating I take the above-named ingredients in about the following proportions: Boiled fish-oil, one gallon; sesquioxide of iron (pulverized) eleven and a half ounces; potash, two and a half ounces; gum-shellac (dissolved) two and a half ounces; calcined plaster-of-paris (pulverized) two and a half pounds. These ingredients are placed in a suitable vessel and boiled, and thoroughly mixed together by stirring or otherwise.

The quantity of calcined plaster-of-paris to be used will vary somewhat according to the specific gravity of the fish-oil. It, of course, thickens the mass, and the person who intends to use the same will put in more or less of the plaster-of-paris to suit his own ideas as to how thick or thin it should be in different cases.

The gum-shellac may be dissolved by placing the lumps in tepid water, and then gradually bringing the water to the boiling-point, and adding to the same one ounce of pearlash, and boiling the mass until the gum is thoroughly dissolved. Instead of gum-shellac, other resinous gums may be employed, such as gum-copal, gum-kowrie, &c. Instead of the potash, soda-ash, or other similar salts, may be used.

I find it very desirable to add to the above-specified mixture before being used some suitable drier—for instance, about three gills of some good liquid or other drier now in the market; and if a liquid drier be used, the increased fluidity given to the mass may be compensated for by the addition of about four ounces of pulverized soap-stone, which latter is another desirable element for giving "body" to the composition. If it be intended to color the cement, any suitable pigment or paint may be added in sufficient quantity to give the desired color.

The above-specified proportions produce a liquid cement which is to be applied with a brush, and while hot—say, boiling hot.

I prefer to sift or throw fine sand, marble-dust, ground silica or any similar substance on the coating before it dries, say, as much as it will "take up;" and in many cases it will be found desirable to apply a second coat in the same manner.

In cases where it is desired to apply the cement with a trowel, a sufficient quantity of Portland cement or other good hydraulic cement, or even fine sand, marble-dust, or ground silica, may be added to the liquid mixture to reduce it to the consistency of mortar, when it may be applied with a trowel instead of a brush.

My improved cement dries sufficiently hard in about two or three days to permit it to be readily marked or blocked off into squares, parallelograms, diamonds, &c., to suit the fancy of the user, and in four or five months it becomes almost as hard as natural stone.

This cement is admirably adapted for roofs, the outside of buildings, floors, &c. Practice has proved that it has a peculiar affinity for wood, and will adhere to it with wonderful tenacity; and moreover, it is of an elastic nature when first applied, say, for two or three months, and hence when applied to surfaces made of tongued or grooved boards, it will allow for any reasonable shrinkage of the same without cracking.

In putting up frame buildings or roofs which are to be coated with my improved cement, unplaned or rough tongued-and-grooved boards may be used, and it is desirable to have a pot of this cement boiling near by, and to apply it with a brush along the tongued-and-grooved edges of the boards, and then crowd or drive the boards together and nail them, the cracks becoming thus thoroughly filled, and when the cement is afterward applied, a perfectly water-proof, hard, and durable surface is obtained, and such surface, when blocked off in a well-known manner, produces a building having externally the appearance of a stone structure.

What I claim as my invention, and desire to secure by Letters Patent, is—

The within-described composition or cement for coating roofs, sides of buildings, floors, sidewalks, &c., composed of the ingredients and made and applied in substantially the manner herein specified.

JOSEPH C. HYATT.

Witnesses:
M. M. LIVINGSTON,
A. J. DE LACY.